United States Patent [19]

Trimarco et al.

[11] 4,399,975
[45] Aug. 23, 1983

[54] SUPPORT STRUCTURE FOR MOUNTING HEAVY OBJECTS

[76] Inventors: Emil P. Trimarco, 6236 W. 124th Pl., Palos Heights, Ill. 60463; Norman S. Kalish, 12948 Crescent Ct., Crestwood, Ill. 60445

[21] Appl. No.: 224,008

[22] Filed: Jan. 12, 1981

[51] Int. Cl.³ .............................................. F16M 9/00
[52] U.S. Cl. ................................... 248/678; 108/901; 248/346
[58] Field of Search ................ 108/901, 902; 248/346, 248/679, 678, 237, 117.3; 52/200; 428/481

[56] References Cited

U.S. PATENT DOCUMENTS

| | | | |
|---|---|---|---|
| 1,738,845 | 12/1929 | Rollman | 248/117.3 |
| 3,413,188 | 11/1968 | Allen | 428/481 X |
| 3,455,858 | 7/1969 | Taft | 428/481 X |
| 3,511,737 | 5/1970 | Katashi | 108/51.1 X |
| 3,521,414 | 7/1970 | Malissa | 52/200 X |
| 3,790,115 | 2/1974 | Fox et al. | 248/346 X |
| 3,880,092 | 4/1975 | Seeber et al. | 108/901 X |
| 3,911,182 | 10/1975 | Lieberman | 108/901 X |

Primary Examiner—William E. Lyddane
Assistant Examiner—Sarah A. Lechok

Attorney, Agent, or Firm—Fitch, Even, Tabin & Flannery

[57] ABSTRACT

A support structure for the stationary, level mounting of heavy objects such as air conditioner condensers and the like. The support structure has a substantially flat top supported by sidewalls with an outwardly extending flange at the bottom edges of the sidewalls. The height and bottom edges of the sidewalls are fabricated to compensate for any slope in the supporting surface upon which the structure is to be rested so that the flat top is maintained substantially horizontal. The flange is parallel to the supporting surface so when the heavy object is rested on the flat top the weight is distributed over the area of the flange. The flat top and sidewalls form a closed surface and have a weather-resistant lamination that is continuous with the flange. If the object is to be roof mounted the flange may be substantially sealed to the roof surface so that moisture and debris do not contact the area of the roof underlying the support structure. Very little deterioration will occur to the underlying roof surface so that if reroofing subsequently becomes necessary, the materials can be applied directly over the flange so that the need to remove the support structure or mounted object is thereby eliminated.

20 Claims, 5 Drawing Figures

SUPPORT STRUCTURE FOR MOUNTING HEAVY OBJECTS

BACKGROUND OF THE INVENTION

This invention relates generally to support structures for the stationary level mounting of heavy objects such as air conditioner condensers and the like. More specifically the invention relates to support structures particularly well-suited for mounting such objects on inclined surfaces and especially building roof tops.

To take advantage of unused space, air conditioner condensers and other heavy objects such as electrical transformers are frequently mounted on building roof tops. The roof top location also provides excellent air circulation that often aids in the operation of such apparatus.

Because of the difficulties involved in supporting and anchoring these heavy objects, roof top mounting is most frequently done on flat roofed buildings. Roof tops are generally constructed only so as to be able to withstand the forces of winds and snow accumulation. Maximum loading is approximately 150 to 200 pounds per square foot and for this reason substantial support is required to prevent the weight of the objects from damaging the roof top.

For roof mounting heavy objects one means of support frequently used is in the form of a steel frame, generally made from "I" beams or angle iron. The steel frame supports the object on legs that have been securely fastened to the underlying roof support structure, which is usually in the form of wooden roof beams or steel bar joists. The legs are made long enough so that the object is supported above the level of the roof top and the load is transmitted directly to the beams or roof support steel.

The above-described form of support has several disadvantages. The installation of a steel frame is labor intensive and costly from the standpoint of materials. When a heavy object is to be mounted on an existing building, an opening must be made in the roof top to gain access to the underlying roof beams or support steel. The opening must be "framed-off" and well sealed to prevent water leakage into the underlying roof support structure. Also, if reroofing subsequently becomes necessary, it is difficult to refinish the surface underneath the steel structure due to the limited space between it and the roof top.

Another practice of roof mounting heavy objects has been to fabricate a wooden support structure, similar to the steel structure described above. To protect the wood from weather and insects, the exposed portion of the support structure is encased in a metal shroud. Since the wooden support structure must also be anchored to the underlying roof beams or support steel and the metal shroud is subject to corrosion, water leakage is a frequent problem.

A third practice of roof mounting has been to place a molded polyethylene pad on the roof surface and resting the heavy object on the pad. While weather-resistant, the molded polyethylene pad, cannot be readily adapted to meet the individual requirements of each installation. Air conditioner condensers and the like are desirably mounted so as to be horizontally level. Since most flat roofs have some slope (of varying degree) to aid in draining off water, some means of shimming the pad to the level position is required. The molds needed to manufacture the polyethylene pad are not easily retooled to compensate for individual roof slopes.

Molded polyethylene pads have also been used to mount heavy objects at ground level. Again, some means of shimming the pad to the level position is required.

Another practice for mounting heavy objects at ground level has been to fabricate a mounting pad from concrete. The pad must be constructed at the desired location and installation of the object delayed until the concrete has cured, thus necessitating the return of workmen to complete the mounting procedure. Since it is not economically feasible to supply ready-mixed concrete in small quantities several such pads are usually poured from a single truckload of concrete or the concrete is mixed at the mounting site.

OBJECTS OF THE INVENTION

The present invention is directed at overcoming the disadvantages and high cost associated with the previous support structures used for the stationary, level mounting of heavy objects such as air conditioner condensers and the like.

It is therefore an object of the invention to provide an improved weather-resistant support structure whereby the weight carried by the support structure is distributed over a large area of the surface on which the structure is rested thereby eliminating the need to anchor the structure to any other support means.

It is also an object of the invention to provide an improved weather-resistant support structure whereby the heavy object may be supported in a substantially level position without the use of shims.

Another object of the invention is to provide an improved weather-resistant support structure for roof mounting heavy objects whereby reroofing may be done without removal of the object or support structure.

Still another object of the invention is to provide a novel method of fabricating such an improved weather-resistant structure.

These and other objects will become apparent to those skilled in the art from the following drawings, descriptions and appended claims.

BRIEF DESCRIPTION OF THE INVENTION

In accordance with the present invention an improved support structure for mounting heavy objects such as air conditioner condensers and the like is constructed. A wooden skeleton is formed by connecting supporting sidewalls to a substantially flat top. To maintain the flat top generally level the height of the sidewalls is varied and the bottom edges of the sidewalls sloped to compensate for any slope in the surface upon which the structure is to rest. The entire skeleton is laminated with a weather-resistant material to a predetermined thickness. The same weather-resistant material is used to form a flange that extends outwardly from the bottom edges of the sidewalls so the weight carried by the support structure may be distributed on the supporting surface over the area of the flange.

As used herein a weather-resistant material is one through which moisture will not penetrate and which will not readily degrade and lose its effectiveness from long term exposure to outdoor elements such as precipitation and temperature fluctuations.

DETAILED DESCRIPTION OF THE INVENTION

Figure 1:
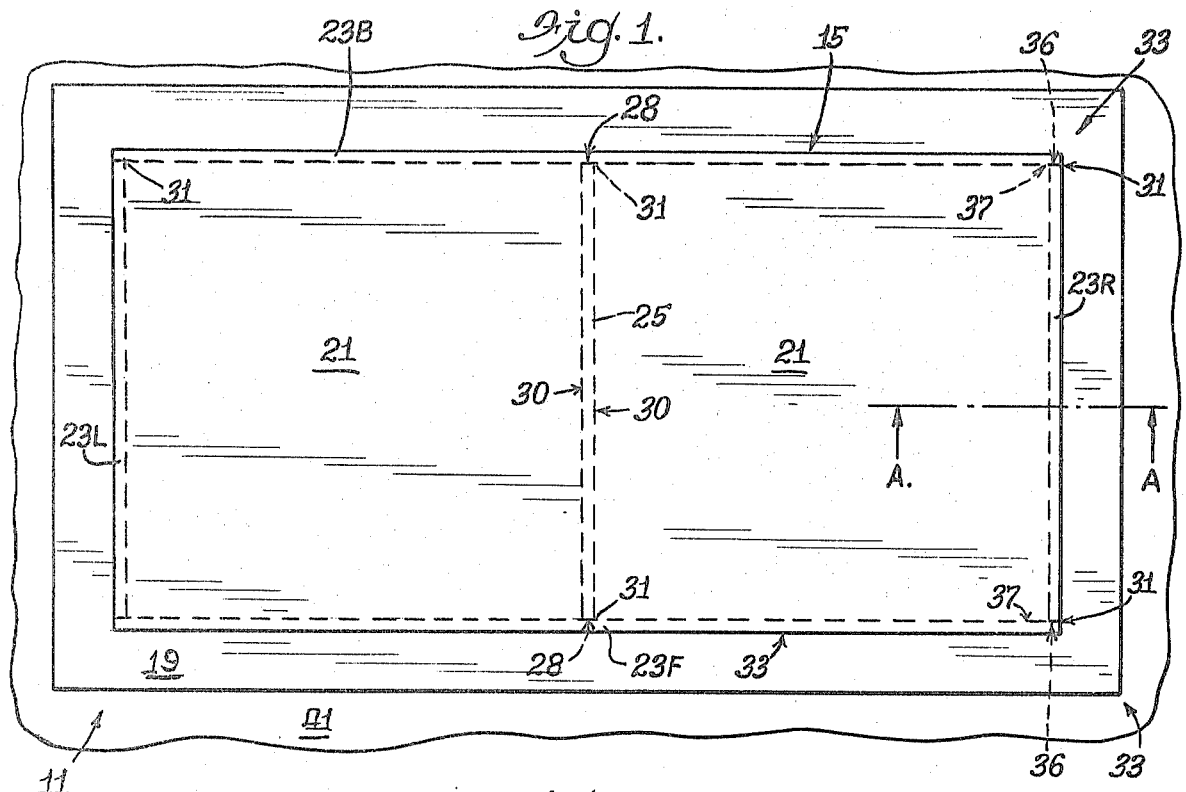
FIG. 1 is a top view of one illustrated embodiment of the support structure showing the general shape of the wooden skeleton and the flange around the periphery of the bottom edges of the sidewalls of the skeleton. For purposes of clarity, the weather-resistant lamination on the skeleton has not been delineated.

In accordance with the present invention an improved support structure 11 for the stationary level mounting of heavy objects 13 such as air conditioner condensers and the like is constructed (FIG. 1 through 5). The object 13 rests directly on the load bearing surface 14 of the support structure (FIGS. 1, 2, 4 and 5) or on optional rubber isolator pads 41 (FIG. 3) where its position is maintained by its own weight. The weight of the object 13 is distributed on the surface upon which the structure is to rest over the area of the flange 19.

Figure 2:
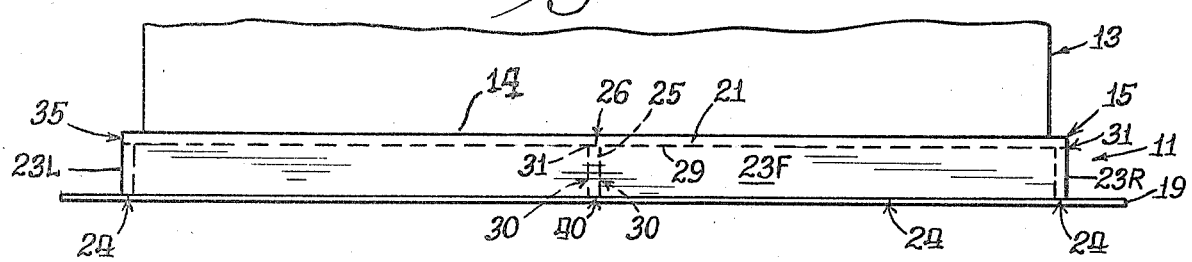
FIG. 2 is a front view of the structure shown in FIG. 1 showing how the sidewalls of the skeleton may be formed to accommodate a level roof.
Figure 3:
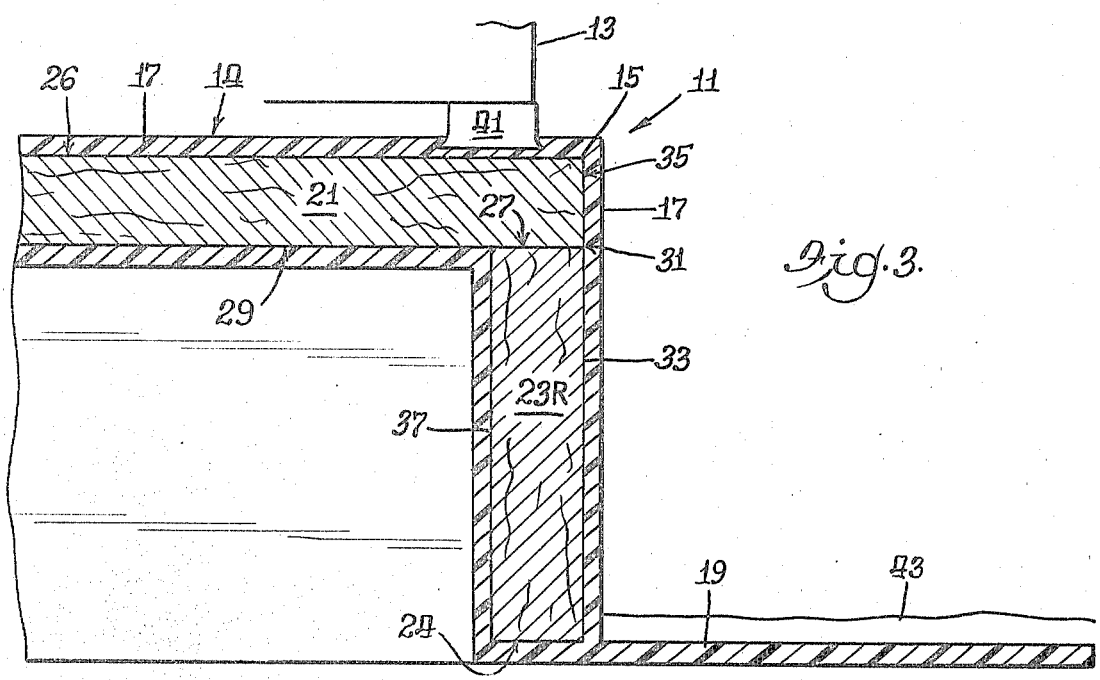
FIG. 3 is a cross-section taken generally along line A—A FIG. 1 showing the relationship of the weather-resistant lamination, the bottom flange and wooden skeleton.

The support structure 11 comprises a wooden skeleton 15, a continuous weather-resistant lamination 17 over the wooden skeleton 15 and a flange 19 that is continuous with the lamination 17 and fabricated from the same weather-resistant material (FIG. 3). The wooden skeleton 15 has a substantially flat top plate 21 supported about its entire periphery by sidewalls 23F, 23B, 23R and 23L that are generally normal to the plane of the top plate 21 (FIGS. 1 and 3). The skeleton 15 may be provided with additional strength by including one or more internal ribs 25 as shown in FIGS. 1 and 2.

In the illustrated embodiment of the invention shown in FIGS. 1, 2 and 3 it can be seen that the top plate 21 has parallel top 26 and bottom 29 planar surfaces and a rectangular peripheral shape as defined by its edges 35. A rectangular shaped top plate 21 will accommodate most air conditioner condenser units and since it is fabricated from wood it may be cut to size. Rectangular dimensions of the top plate typically range from about 24×36 inches to about 48×96 inches. The peripheral shape of the top plate 21 may, however, be varied to accommodate an odd-shaped object as discussed hereinafter in conjunction with FIG. 5. The sidewalls 23F, 23B, 23R and 23L are generally rectangularly shaped and have parallel outside 33 and inside 37 planar surfaces with bottom 24, top 27 and vertical 36 edges normal to the planar surfaces 33 and 37.

The relative positioning of sidewalls 23R with respect to the top plate 21 is shown in FIG. 3 and is illustrative of all the sidewalls in this respect. The top edge 27 of sidewall 23R is contacted with the bottom surface 29 of the top plate 21 to form a simple butt joint 31. Since the top edge 27 is perpendicular to the outside planar surface 33 of the sidewall 23R, the outside planar surface 33 may be made flush with the edge 35 of the top plate 21. The internal rib 25 has a top edge 26 and vertical edges 28 that form similar butt joints 31 with, respectively, the bottom surface 29 of the top plate 21 (FIG. 2) and the inside planar surfaces 37 of sidewalls 23F and 23B (FIG. 1). Butt joints 31 are also formed at the corners of the wooden skeleton 15 by the vertical edges 36 of sidewalls 23R and 23L and the inside planar surfaces 37 of the adjacent sidewalls 23F and 23B (FIG. 1). The butt joints 31 may be held together by a variety of fastening means (not shown) including nails, wood screws and adhesives. Each sidewall 23F, 23B, 23R and 23L is joined with its two adjacent sidewalls as well as the top plate 21 thereby forming a continuous closed surface.

Once constructed, the wooden skeleton 15 receives the lamination 17 (FIG. 3). While a main function of the lamination 17 is to provide the wooden skeleton 15 with weather resistance, a properly chosen material or composite may also impart it with considerable additional strength. A combination of polyester and chopped fiberglass filaments has been found to achieve both these results and may be spray-coated as a mud-like composite through the use of various commercially available pneumatic guns. The composite hardens with time thereby forming the lamination 17.

Liquid polyester resin and a "hardening" catalyst are commercially available through suppliers and manufacturers such as Reichhold Inc. who sells products under the tradename "Polylite". Fiberglass filaments are supplied from fiberglass rope having individual filament diameters of about 0.00020–0.00029 inch. A pneumatic gun available from Binx Inc. ("Maverick Model") automatically cuts the fiberglass rope to the proper filament length, mixes the fiberglass filaments, polyester resin and hardening catalyst in the proper proportions, and sprays the mud-like composite where directed. The thickness of the lamination may be built up by successive coats of composite, each preferably being approximately 1/16 inch thick. A mixture of composite that is roughly 28–33 weight percent fiberglass provides excellent strength and weather resistance.

Since the lamination 17 is used to impart both strength and weather resistance to the support structure 11, the entire skeleton 15 is spray-coated so that no wooden surfaces are left exposed and the lamination 17 is continuous over the support structure 11 (FIG. 3). This substantially seals the wooden skeleton from moisture and greatly extends its life.

In the normal mode of manufacturing the support structure 11, the wooden skeleton 15 is first constructed. If the surface of the wood is very smooth it may be sandblasted to provide for better adhesion of the lamination 17. It is then inverted and all exposed interior wooden surfaces are spray coated including the bottom surface 29 of the top plate 21, both faces 30 and bottom edge 40 of any internal ribs 25 as well as the bottom edges 24 and inside planar surfaces 37 of the sidewalls 23F, 23B, 23R and 23L. Before the composite completely hardens, the wooden skeleton 15 is righted and placed on a flat surface that has been specially treated with a release agent or parting compound to prevent the composite from adhering to the surface. The dimensions of the surface used must be great enough so that the flange 19 may be formed thereon. The composite is then sprayed on the exterior surfaces of the wooden skeleton 15 covering the top planar surface 26 and edges 35 of the top plate 21 and the outside planar surfaces 33 of the sidewalls 23F, 23B, 23R and 23L. In the same operation, a substantially uniform thickness of the composite is also sprayed on the flat surface about the periphery of the wooden skeleton 15, extending outwardly from the bottom of the sidewalls to form the flange 19 (FIGS. 1 and 3). Thus, as the composite hardens, the flange 19 so formed bonds to and becomes continuous with the lamination 17 on the exterior and interior surfaces of the wooden skeleton 15. The flange 19 may then be trimmed to a uniform width as shown in FIG. 1, typically about 6 inches.

If the weight of the object 13 intended to be supported warrants the load-bearing capacity of the structure 11 be increased, additional spray coats of composite may be used to increase the thickness of the lamination 17 and the flange 19. Typically, the wooden skeleton 15 is spray coated until the lamination 17 is about ⅛ to about 3/16 inch thick.

While standard ¾ inch plywood is most often used to construct the wooden skeleton 15, the strength of a lamination 17 comprised of polyester and chopped fiberglass filaments is great enough so that the skeleton 15 may be built entirely from balsa wood. The porosity of the balsa wood causes it to absorb the polyester resin and hardening catalyst mixture while it is still in liquid form. After hardening, the strength of the balsa wood skeleton is greatly increased. Successive coats of polyester and chopped fiberglass are used to further increase the strength of the support structure 11 and to form the flange 19. Support structures with skeletons 15 fabricated from balsa wood may be used to support smaller air conditioner condenser units that generally have a cooling capacity of about 10,000 B.T.U.'s.

Air conditioner condensers that have a large cooling capacity (about 50,000 B.T.U.'s) are generally much heavier and require a very sturdy support structure 11. For these applications the wooden skeleton 15 is fabricated from one inch thick, 17 ply Finnish birch. This material has a compressive strength of about 230 p.s.i. enabling it to impart extra load-bearing capacity to the support structure 11.

Occasionally, it is desirable to allow for air flow beneath the supported object 13 or to dampen the transmission of vibrations from the object to the support structure 11. This can be accomplished by placing a plurality of rubber isolator pads 41 between the object 13 and the load-bearing surface 14 of the support structure 11 (one such rubber isolator pad 41 is shown in FIG. 3 only). The rubber isolator pads 41 may be fastened to the support structure 11 by pressing directly into the polyester and chopped fiberglass composite before it hardens so that it is embedded in the lamination 17.

After the composite has completely hardened thereby forming the flange 19 and the lamination 17 over the wooden skeleton 15 the support structure 11 is complete. If the support structure 11 is used for roof mounting of an object 13, an underlayment 41 (FIG. 1) of ninety to one hundred pound felt roofing paper is laid directly on the roof surface at the desired mounting location. The support structure 11 is then placed on top of the underlayment 41. The underlayment 41 is positioned between the flange 19 and the roof surface under the support structure 11. The object 13 is then rested directly on the load bearing surface 14 (FIG. 2) or the optional rubber isolator pads 41 (FIG. 3). The weight of the object 13 is distributed over the flange 19. The compressive stress exerted by the flange 19 is low enough so that very little damage results to the roof surface. The stress is, however, high enough so that the underlayment 41 forms a moisture resistant seal between the flange 19 and the underlying roof surface. Since the lamination 17 is continuous over the entire surface of the support structure 11, the underlying roof surface will be substantially sealed from moisture and other debris. Consequently, the underlying roof surface will suffer very little deterioration with time. Thus, when reroofing of the exposed roof surface becomes necessary, the support structure 11 need not be removed. The reroofing material 43 such as tar may be placed directly over the flange 19 (FIG. 3). If it is determined that reroofing will be done shortly after installation of the support structure 11, the underlayment 41 may be omitted as the reroofing material 43 may be used to effect a moisture resistant seal.

Figure 4:
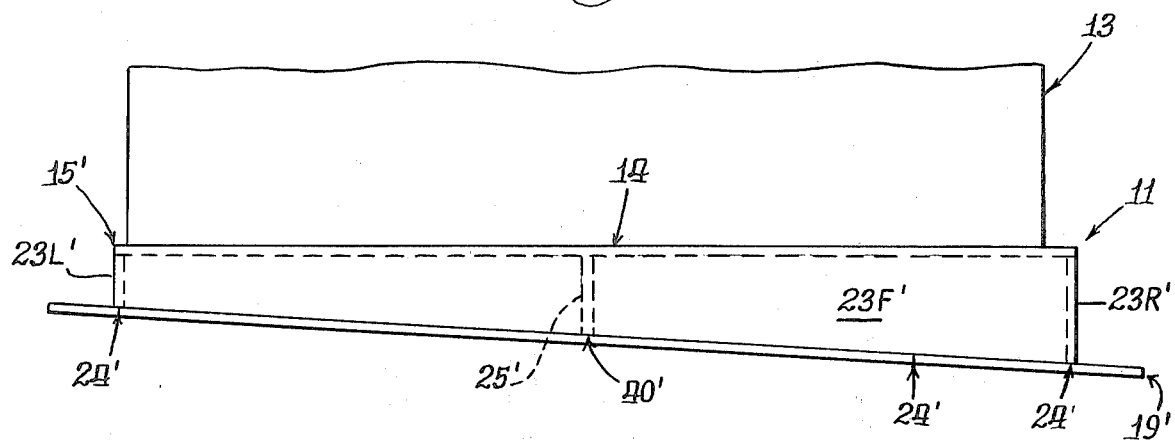
FIG. 4 is a front view similar to FIG. 2 of a second illustrated embodiment of the invention showing how the sidewalls may be formed to accommodate a sloped roof.

A second embodiment of the support structure 11, shown in FIG. 4, is constructed to provide level support for a heavy object on a sloped surface. In the modified skeleton 15' the general shape of sidewalls 23F' and 23B' (not shown) is trapezoidal. The slope of the bottom edge 24' on sidewalls 23F' and 23B' is equal to the slope of the supporting surface upon which the structure 11 is rested so that the load bearing surface 14 remains generally level. The height of sidewall 23R' and the internal rib 25' is increased proportionately. If the degree of slope is large the bottom edges 24' of sidewalls 23L' and 23R' as well as the bottom edge 40' of the internal rib 25' may have to be beveled so as to be coplaner with the bottom edge 24' of sidewalls 23F' and 23B'. The flange 19' is formed as previously described, and is then parallel to the sloped surface.

Figure 5:
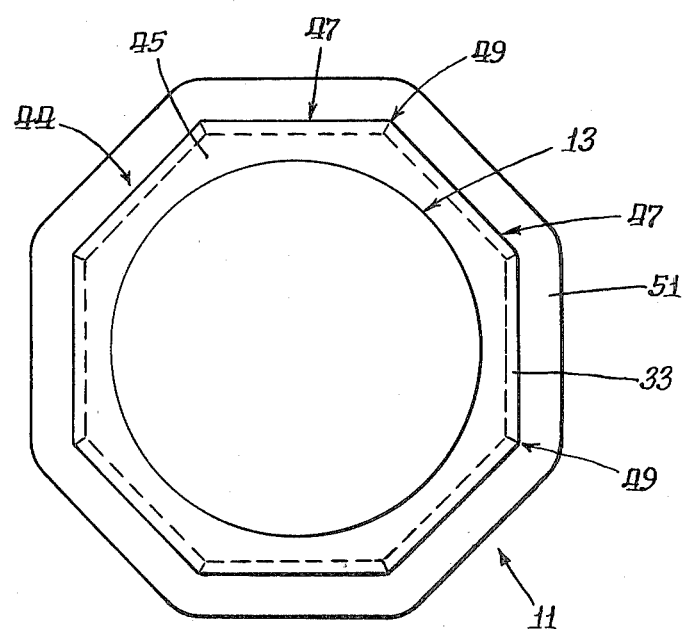
FIG. 5 is a top view of a third illustrated embodiment of the invention for supporting a cylindrical object.

A third illustrated embodiment of the invention is shown in FIG. 5. The skeleton 44 has a top plate 45 in the general shape of an octagon to accommodate a cylindrical object 13. The top plate 45 is supported by eight sidewalls 47 joined to the top plate 45 continuously about its periphery by butt joints 31. The sidewalls 47 are joined to one another by miter joints 49. For purposes of clarity, the weather-resistant lamination has not been delineated. The flange 51 extends about the entire periphery of the support structure 11 at the bottom edges (not shown) of the sidewalls 47.

From the foregoing it should be appreciated that a novel apparatus for roof mounting heavy objects such as air conditioner condensers and the like and a method of constructing the same have been described. The support structure is fabricated so the load bearing surface has a shape and dimensions corresponding to the object to be supported. The bottom edges and shape of the sidewalls may be easily custom formed to compensate for roof slope so the load bearing surface is maintained substantially level. The weight of the mounted object holds both the support structure and the object in place. The weight of the object is distributed over a large area by a flange so that if the object is roof mounted very little damage is done to the load bearing roof surface, thereby eliminating the need to gain access to the underlying roof support structure for the purpose of transferring the load directly thereto. A weather-resistant lamination, continuous over the entire structure and a procedure for providing a moisture resistant seal between the load-bearing roof surface and the flange, allows the roof surface underlying the structure to be substantially protected from moisture and debris. Very little deterioration of the underlying roof surface will occur with time and if reroofing of the exposed roof becomes necessary, the reroofing material can be placed directly over the flange, eliminating the need to remove the mounted object or the support structure.

It should be understood that although certain preferred embodiments of the present invention have been illustrated and described, various modifications, alternatives and equivalents thereof will become apparent to those skilled in the art and accordingly the scope of the present invention should be defined only by the appended claims and equivalents thereof.

Various features of the invention are set forth in the following claims.

What is claimed is:

1. A weather-resistant support structure for the stationary level mounting of heavy objects such as air conditioner condensers and the like on a roof surface which may be sloped, comprising:
    a wooden skeleton having a substantially flat top supported by a plurality of sidewalls, said sidewalls being generally normal to said flat top and having height dimensions and bottom edges formed to compensate for any slope of the roof surface upon which said structure is to rest so that the flat top is generally level,
    a weather-resistant lamination of a predetermined thickness entirely covering said wooden skeleton to substantially seal the same from moisture and to impart additional structural strength, and
    a weather-resistant flange extending outwardly from the bottom of said sidewalls, generally parallel to the roof surface upon which said structure is to rest, so that the weight to be carried by the structure will be distributed on the roof surface generally over the entire area of said flange.

2. A structure in accordance with claim 1 wherein said skeleton has at least one rib extending between two of said sidewalls.

3. A structure in accordance with claim 1 wherein said wooden skeleton is fabricated from plywood.

4. A structure in accordance with claim 1 wherein said wooden skeleton is fabricated from balsa wood.

5. A structure in accordance with claim 1 wherein said weather-resistant lamination is a composite of polyester and chopped fiberglass filaments.

6. A structure in accordance with claim 5 wherein the thickness of said lamination is between about 1/16 and about 3/16 inch.

7. A structure in accordance with claim 1 wherein said flange is fabricated from a composite of polyester and chopped fiberglass filaments.

8. A structure in accordance with claim 7 wherein said flange has a thickness of about 1/16 to about 3/16 inch and a width of about 6 inches.

9. A structure in accordance with claim 1 wherein said flat top and sidewalls form a closed surface and said flange is continuous with said weather-resistant lamination and extends about the entire periphery of said structure so that said flange may be used to substantially seal out moisture and debris from that area of the roof surface upon which said structure is to rest.

10. A structure in accordance with claim 1 including at least one isolator pad on the laminated flat top of said wooden skeleton, upon which said heavy object may be rested.

11. A method of fabricating a support structure for the stationary level mounting of heavy objects such as air conditioner condensers and the like on a roof surface which may be sloped, comprising:
    forming a substantially flat top from wood material,
    forming a plurality of sidewalls from wood material for supporting said flat top, having height dimensions and bottom edges formed to compensate for the slope of the roof surface upon which said structure is to rest so that said flat top will be generally level,
    connecting said sidewalls to said flat top in such a manner that said sidewalls are generally normal to said flat top to form a wooden skeleton,
    applying a predetermined thickness of a weather-resistant lamination over the entire surface of said wooden skeleton to substantially seal the same from moisture and to impart additional structural strength, and
    forming a weather-resistant flange extending outwardly from the bottom of said sidewalls and generally parallel to the supporting surface upon which the structure is to rest so that the weight carried by said structure will be distributed on the roof surface generally over the entire area of the flange.

12. A method in accordance with claim 11 further comprising connecting at least one rib to said wooden skeleton, extending between two of said sidewalls.

13. A method in accordance with claim 11 wherein said weather-resistant lamination comprises a composite of polyester and chopped fiberglass filaments, and said step of applying the same comprises spraying said composite upon said skeleton.

14. A method in accordance with claim 13 wherein the predetermined thickness of said weather-resistant lamination is about 1/16 to about 3/16 inch.

15. A method in accordance with claim 11 wherein said wood material is plywood.

16. A method in accordance with claim 11 wherein said wood material is balsa wood.

17. A method in accordance with claim 11 wherein said flange comprises a composite of polyester and chopped fiberglass filaments, and said step of forming the same comprises spraying said composite upon a flat surface adjacent to the bottom of said sidewalls.

18. A method in accordance with claim 17 wherein said flange is formed to have thickness of about 1/16 to about 3/16 inch and a width of about 6 inches.

19. A method in accordance with claim 11 wherein said flat top and sidewalls form a closed surface and said flange is continuous with said lamination and extends about the entire periphery of said structure so that said flange may be used to substantially seal out moisture and debris from that area of the roof surface upon which said structure is to rest.

20. A method in accordance with claim 11 further comprising providing at least one isolator pad on the laiminated flat top of said skeleton.

* * * * *